(12) United States Patent (10) Patent No.: US 9,364,133 B2
Rosenbauer (45) Date of Patent: Jun. 14, 2016

(54) WASHING METHOD FOR A DISHWASHING MACHINE

(75) Inventor: Michael Georg Rosenbauer, Reimlingen (DE)

(73) Assignee: BSH Hausgeräte GmbH, Munich (DE)

( * ) Notice: Subject to any disclaimer, the term of this patent is extended or adjusted under 35 U.S.C. 154(b) by 806 days.

(21) Appl. No.: 13/003,769

(22) PCT Filed: Jul. 24, 2009

(86) PCT No.: PCT/EP2009/059530
§ 371 (c)(1),
(2), (4) Date: Jan. 12, 2011

(87) PCT Pub. No.: WO2010/010166
PCT Pub. Date: Jan. 28, 2010

(65) Prior Publication Data
US 2011/0114133 A1    May 19, 2011

(30) Foreign Application Priority Data
Jul. 25, 2008 (DE) .......................... 10 2008 040 745

(51) Int. Cl.
*B08B 7/04* (2006.01)
*B08B 9/20* (2006.01)
*B08B 3/00* (2006.01)
(Continued)

(52) U.S. Cl.
CPC ............ *A47L 15/483* (2013.01); *A47L 15/0013* (2013.01); *A47L 15/4291* (2013.01); *A47L 2601/02* (2013.01); *Y02B 40/44* (2013.01)

(58) Field of Classification Search
USPC ............... 134/11, 42, 10, 18, 22.12, 25.2, 54, 134/56 R, 56 D, 60, 103.1, 107.201
See application file for complete search history.

(56) References Cited

U.S. PATENT DOCUMENTS 3,704,170 A * 11/1972 Landwier ..................... 134/25.2
5,829,459 A * 11/1998 Milocco .............. A47L 15/4291
134/201

(Continued)

FOREIGN PATENT DOCUMENTS

EP       0978250 A2    2/2000
FR       2483767    * 12/1981  .............. A47L 15/00
(Continued)

OTHER PUBLICATIONS

English Translation WO2009074415.*
(Continued)

*Primary Examiner* — Eric Golightly
*Assistant Examiner* — Arlyn I Rivera-Cordero
(74) *Attorney, Agent, or Firm* — James E. Howard; Andre Pallapies (57) ABSTRACT

A washing method for a dishwasher is provided, wherein the dishwasher has a wash container that delimits a wash compartment. The washing method includes buffering wash liquid that is no longer required during or after execution of a wash operation in a storage container that is thermally coupled to the wash container; condensing, in a drying step of the wash operation, moisture-laden air or water vapor in the wash compartment of the wash container on at least one side wall of the wash container; and, before or during the drying step, filling the storage container with fresh water to provide a condensation surface.

20 Claims, 6 Drawing Sheets

(51) Int. Cl.
*B08B 3/04* (2006.01)
*A47L 15/48* (2006.01)
*A47L 15/00* (2006.01)
*A47L 15/42* (2006.01)

(56) References Cited

U.S. PATENT DOCUMENTS

| | | |
|---|---|---|
| 2003/0140517 A1 | 7/2003 | Schmid |
| 2006/0219262 A1* | 10/2006 | Peterson et al. ............... 134/18 |
| 2006/0236556 A1 | 10/2006 | Ferguson et al. |
| 2007/0251549 A1 | 11/2007 | Heiligenmann et al. |
| 2010/0258145 A1 | 10/2010 | Heissler et al. |

FOREIGN PATENT DOCUMENTS

| | | | | |
|---|---|---|---|---|
| FR | 2483767 A1 | 12/1981 | | |
| GB | 2139083 B | 11/1984 | | |
| WO | WO2005053504 A1 | 6/2005 | | |
| WO | WO2009/9074415 | * | 6/2009 | ............ A47L 15/48 |
| WO | WO2009074415 | * | 6/2009 | ............ A47L 15/42 |

OTHER PUBLICATIONS

FR2483767 English translation, accessed on Sep. 2015.*
Granting Decision RU 2011103713 dated Jun. 14, 2013.

* cited by examiner

WASHING METHOD FOR A DISHWASHING MACHINE

BACKGROUND OF THE INVENTION

The invention relates to a washing method for a dishwasher.

During the wash operation of a dishwasher the control facility of said dishwasher controls a wash program sequence made up of subprogram steps, specifically prewash, cleaning, intermediate rinse, final rinse and drying. The drying step can take place according to the condensation principle or by means of an external drying system, in which the moisture-laden air from the wash compartment is passed through a sorption column.

A dishwasher is known from WO 2005/063109 A1, in which in a drying step the moisture-laden air or water vapor in the wash container is condensed on the side walls of the wash container according to the condensation principle. A heat exchanger is provided on one wall of the wash container, which is filled with cold fresh water during drying producing a cold condensation surface on the wash container wall, thereby enhancing drying performance. The fresh water buffered in the heat exchanger can then be reused as wash liquid without further ado.

Drying according to the condensation principle takes longer than the above-mentioned external drying system.

BRIEF SUMMARY OF THE INVENTION

The object of the invention is to provide a washing method for a dishwasher and a dishwasher with which the drying time is further shortened.

The invention is based on a washing method for a dishwasher having a wash container that delimits a wash compartment, in which wash liquid that is no longer required during or after execution of a wash operation is buffered in a storage container coupled thermally to the wash container and in a drying step of the wash operation the moisture-laden air or water vapor in a wash compartment of the wash container is condensed on at least one side wall of the wash container.

According to the characterizing portion of claim 1 before or during the drying step to provide a condensation surface a storage container coupled thermally to a wash container side wall is filled with cold fresh water, the temperature of which is below room temperature, from the fresh water supply network. Wash liquid that is no longer normally required during a wash operation can be buffered in the storage container known per se and can then be used in a subsequent wash operation or wash cycle, for example in a prewash step. In this manner a heat exchanger surface is provided which accelerates condensation drying. The invention can be realized simply by adapting the liquid conveyance taking place in the wash operation, without additional heat exchanger components being required.

To further accelerate the drying process at least one heat exchanger is preferably provided, which is coupled thermally to a storage container side wall. The heat exchanger can likewise be filled with cool fresh water during the drying step. The temperature of the fresh water coming from the supply network is generally in a range from 13 to 15° C.

The heat exchanger, like the storage container, can be filled with fresh water during the drying step. To provide a further condensation surface the wash container can also be filled to a predetermined fill level with fresh water. In total therefore two wash container side walls and the wash container base or the water surface of the fresh water introduced into the wash container provide three cold condensation surfaces.

In a particularly advantageous method implementation the heat exchanger can first be filled with fresh water, thereby cooling the first wash container side wall. Then after a predetermined waiting period the fresh water stored in the heat exchanger can be emptied into the wash container. The wash container is therefore filled in the pump sump region with the fresh water buffered in the heat exchanger up to the predetermined fill level. At the same time the first wash container side wall remains sufficiently cool for at least a certain time period despite the now emptied heat exchanger. According to the invention the same quantity of fresh water is used to produce both a first cold condensation surface on the first wash container side wall and a second condensation surface, which is formed by the water surface of the quantity of fresh water conducted into the wash container.

In a further method step the fresh water in the pump sump region of the wash container can be conducted on into the storage container, which is coupled thermally to the second wash container side wall. With this inventive method implementation the heat exchanger is therefore filled with fresh water first. The quantity of fresh water is then circulated from the heat exchanger by way of the wash container into the storage container.

In total therefore three condensation surfaces can be provided with the same quantity of fresh water in this method implementation. The waiting period for the quantity of fresh water in the first heat exchanger, in the pump sump region and in the storage container is set in such a manner that the wash container side walls and/or the pump sump region can be adequately cooled.

It is also advantageous, to reduce the drying time further, if the heat exchanger, which is emptied after the abovementioned first method step is filled with fresh water again, causing the condensation surface assigned to the first wash container side wall to cool down again.

Once the drying step has been executed, the quantity of fresh water buffered in the heat exchanger and/or in the storage container is no longer required. However the buffered quantity of fresh water is preferably not pumped away by means of a drain pump or the like but remains buffered for reuse in a subsequent wash operation or wash cycle, for example in the prewash step or in the cleaning step of the next wash operation.

BRIEF DESCRIPTION OF THE DRAWINGS

An exemplary embodiment of the invention is described below with reference to the accompanying figures, in which.

DETAILED DESCRIPTION OF EXEMPLARY EMBODIMENTS OF THE PRESENT INVENTION

Figure 1:
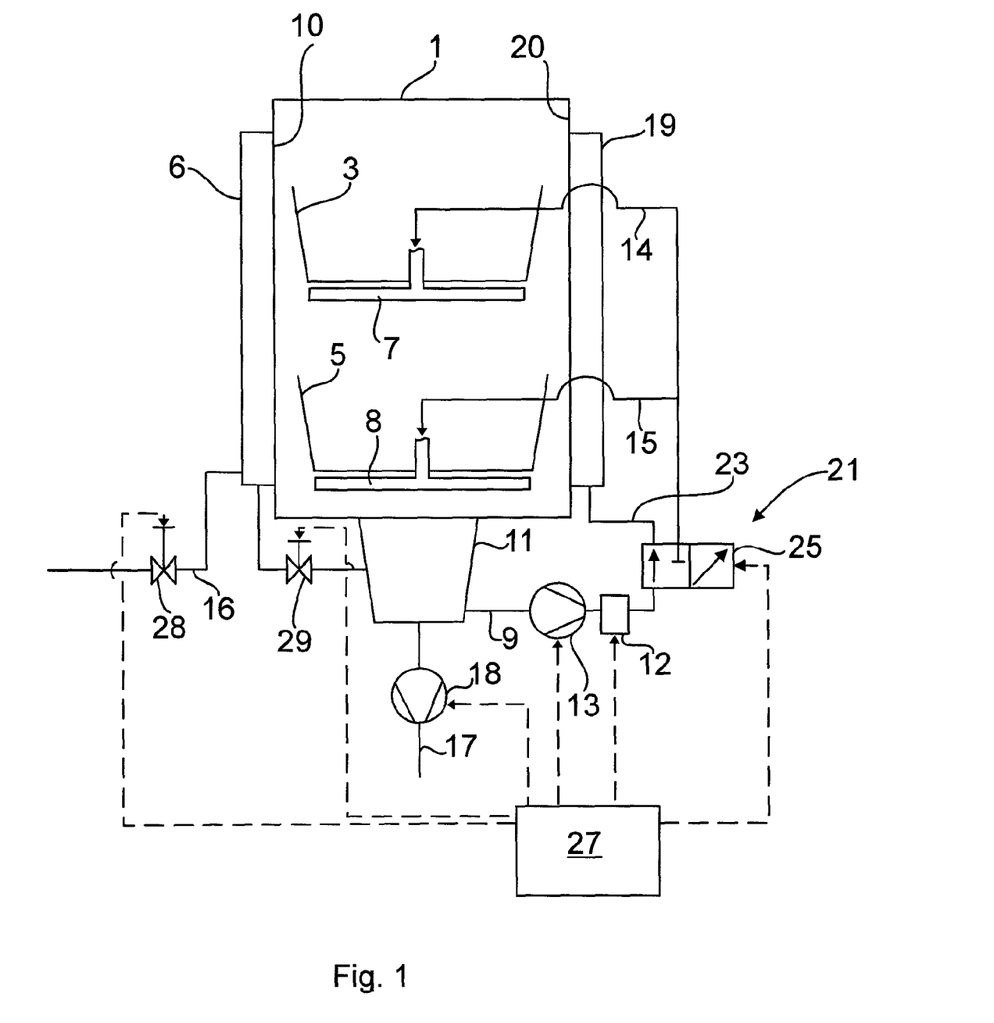
FIG. 1 shows a schematic block diagram of a dishwasher for implementing the inventive washing method.

FIG. 1 shows a schematic diagram of a dishwasher having a wash container 1 that delimits a wash compartment. Items to be washed (not shown) can be disposed in racks 3, 5 in the wash compartment of the wash container 1. Two spray arms 7, 8 provided at different spray levels are disposed by way of example in the wash container 1 shown to apply wash liquid to the items to be washed.

A pump sump 11 with an assigned circulation pump 13 is provided in the wash container base, being connected by way of supply lines 14, 15 for flow purposes to the spray arms 7, 8. Downstream of the circulation pump 13 which is disposed in a circulation line 9 is a heating element 12, for example a flow-through water heater, also referred to as a water heater. The pump sump 11 is also connected by way of connecting studs to a fresh water supply line 16 coupled to the water supply network. A first heat exchanger 6 serving as a storage tank is connected in the fresh water supply line 16, being thermally coupled to and in contact with a first wash container side wall 10.

The pump sump 11 is also connected by way of a further connecting stud to a discharge line 17, in which a drain pump 18 is disposed to pump wash liquid out of the wash container 1.

The wash container 1 further features a storage container or what is known as a wash liquor storage unit 19 on the outside of its right side wall 20 in FIG. 1, this wash liquor storage unit 19 likewise being coupled thermally to and in contact with the wash container 1 and acting as a second heat exchanger. As described in detail below wash liquid that is no longer required after execution of a subprogram step, for example the final rinse K, can be buffered in the wash liquor storage unit 19. The buffered wash liquid is used in the next wash cycle or wash operation, for example in the prewash step V.

The circulation line 9 together with the supply lines 14, 15 and the wash compartment forms a closed hydraulic circuit, in which the wash liquid circulates in the subprogram steps where liquid is deployed and is applied to the items to be washed by way of the spray arms 7, 8. Downstream of the heating element 12 disposed in the circulation line 9 a connecting line 23 leading to the wash liquor storage unit 19 branches at a branch point 21. A water switch 25 is provided at the branch point 21, being shown here for example as an electromagnetically actuatable three-way switching valve 25. In a first switching position shown the three-way switching valve 25 connects the circulation line 9 to the connecting line 23 leading to the wash liquor storage unit 19 and breaks the abovementioned hydraulic circuit. In contrast in a second switching position (not shown) the three-way switching valve 25 breaks the connection to the wash liquor storage unit 19, while the circulation line 9 is connected to the supply lines 14, 15.

Figure 2:
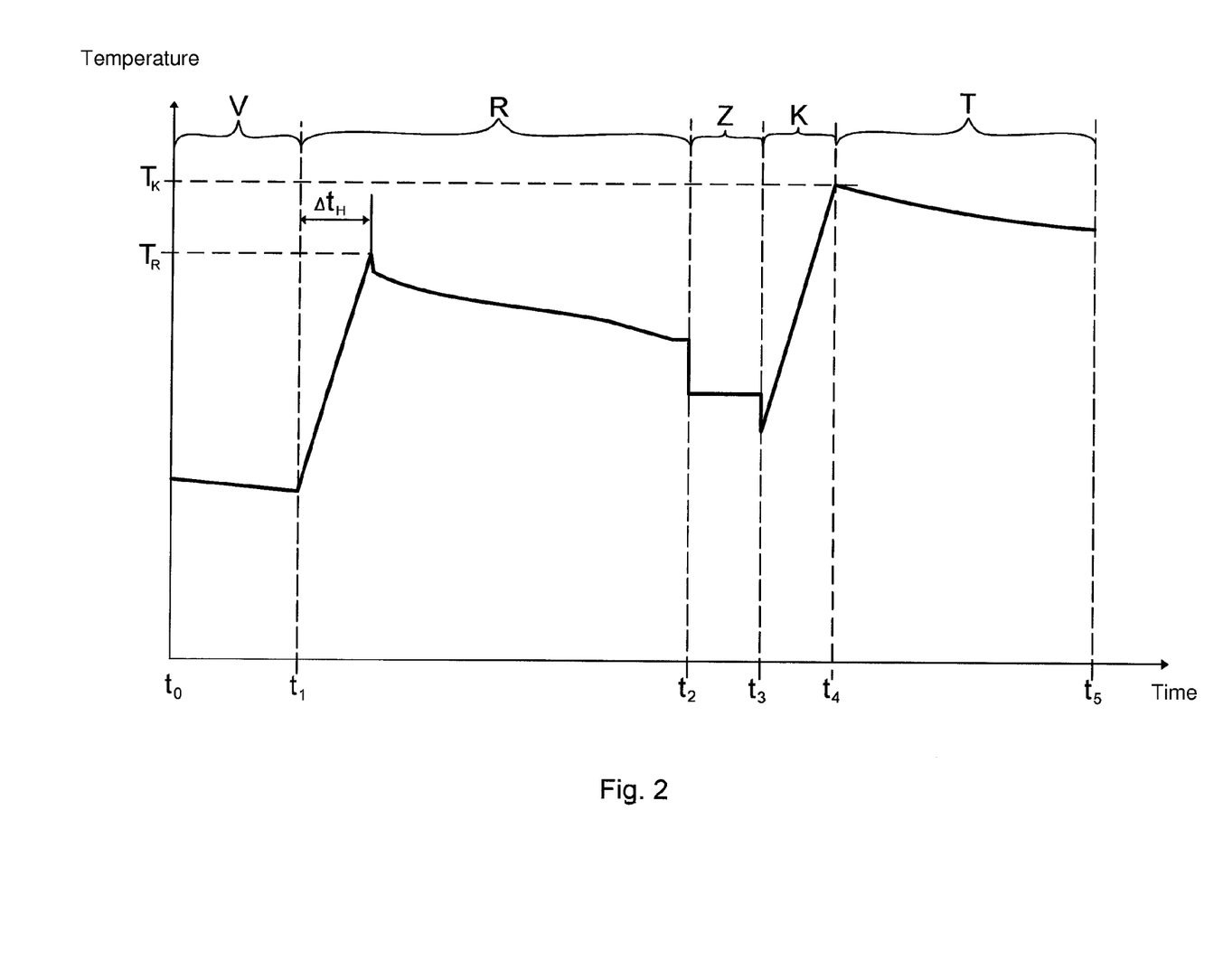
FIG. 2 shows a temperature/time diagram to illustrate the subprogram steps implemented in a wash operation.

FIG. 2 shows a wash program sequence for the dishwasher with reference to a temperature/time diagram. The program sequence features the individual subprogram steps of a wash operation, namely prewash V, cleaning R, intermediate rinse Z, final rinse K and drying T. In modifications to the program sequence, the subprogram steps prewash V and/or intermediate rinse can be skipped. The subprogram steps of the wash operation are executed by means of a control facility 27 by corresponding activation of the appliance components. The temperature/time profile here relates to a mixture temperature in the wash compartment, which is established in the items to be washed, in the wash container and optionally in the wash liquid.

The wash operation of the dishwasher is described below with reference to the temperature/time profile in FIG. 2, in so far as is necessary for an understanding of the invention:

After the start of the wash operation at time $t_0$ the prewash step V takes place, in which fresh water is introduced by way of the supply line 16 into the hydraulic circuit. The temperature of the fresh water coming straight from the water supply network is around 15° C.

So that fresh water that has already been preheated to around ambient temperature can be used in the prewash step V, a quantity of fresh water can be buffered in the heat exchanger 6 in the previous wash operation, being used in the next wash operation for the prewash V. At the end of the prewash step V, in other words at time $t_1$, the wash liquid is pumped away by means of the drain pump 18. Fresh water for the following cleaning step R is then supplied to pump sump region of the wash container 1. The cleaning step R starts at time $t_1$ with a heating phase $\Delta t_H$, in which the wash liquid circulating in the hydraulic circuit is heated by the water heater 12 to a cleaning temperature $T_R$ of around 50° C. During the cleaning step R both the heat exchanger 6 and the wash liquor storage unit 19 are emptied, in other words filled with air, to improve the thermal insulation of the wash compartment.

At the end of the cleaning step R, in other words at time $t_2$, the wash liquid is pumped out of the wash container 1 into the waste water system.

Fresh water is then supplied both in the intermediate rinse step Z and in the final rinse step K. The liquid circulated in the hydraulic circuit during the final rinse step K is also heated by the water heater 12 to a final rinse temperature $T_K$ of approx. 65° C. After execution of the final rinse step K at time $t_4$ the wash liquid is discharged and the drying step T begins.

The items to be washed are dried here using the condensation principle, in which the moisture-laden air in the wash compartment condenses on condensation surfaces of the wash compartment side walls 10, 20. The time interval $t_4$-$t_5$ required to dry the items to be washed is reduced by the inventive method implementation explained below and illustrated with reference to FIGS. 3 to 6.

Figure 3:
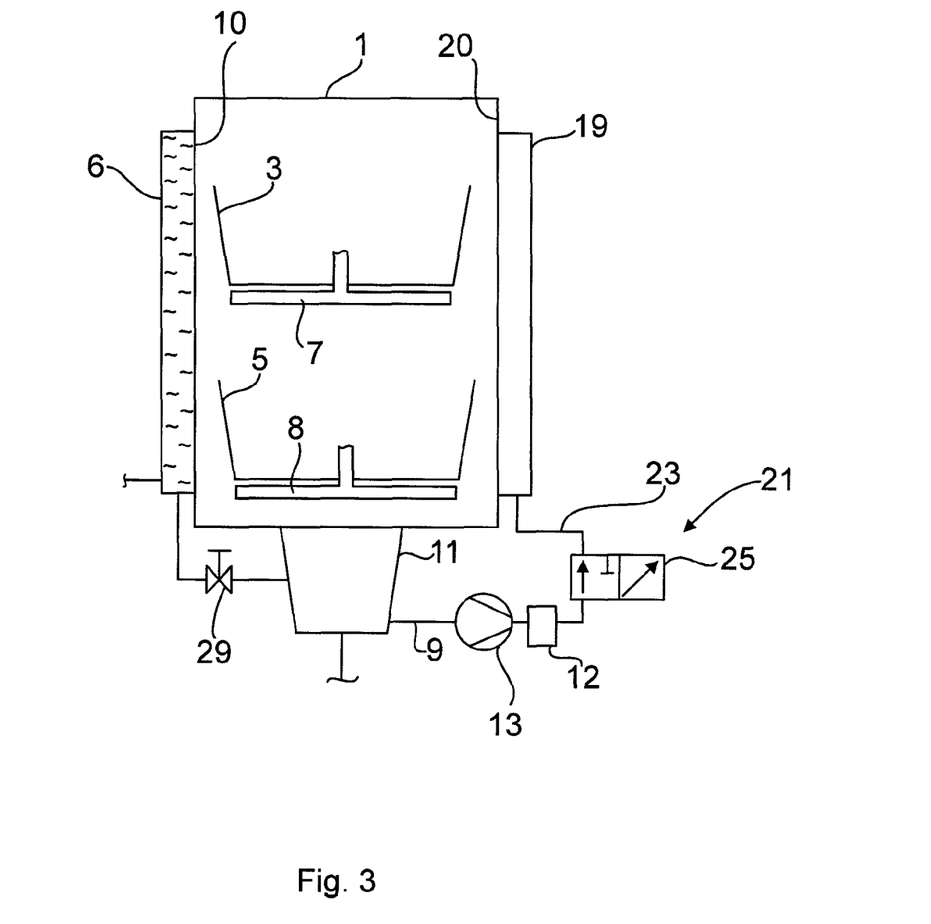
FIGS. 3 to 6 show the inventive liquid conveyance during a drying step in a wash operation of the dishwasher.

At the start of the drying step T in a first method step the first heat exchanger 6 is filled with cold fresh water. To this end the control facility 27 opens the water inlet valve 28 in the fresh water supply line 16 until the heat exchanger 6 is full, as shown in FIG. 3. A waiting period for the cold fresh water in the heat exchanger 6 is set so that the wash container side wall 10 is adequately cooled.

Figure 4:
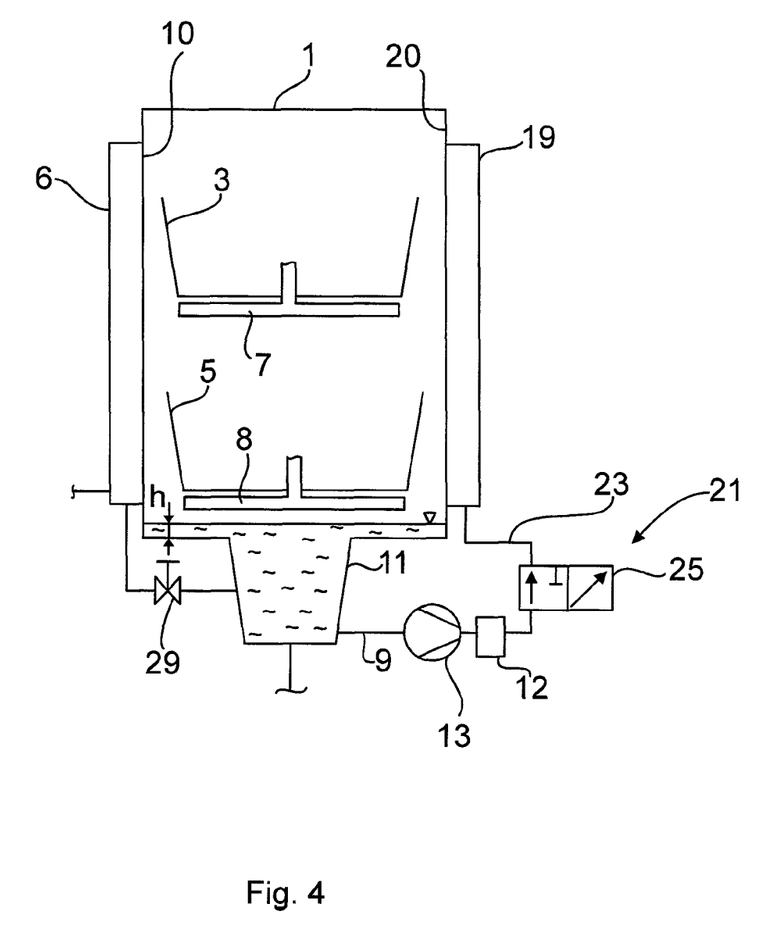

In a second method step the wash container 1 is filled to a fill level h using the quantity of fresh water buffered in the first heat exchanger 6. To this end the control facility 27 opens the check valve 29 connected for flow purposes between the first heat exchanger 6 and the pump sump 11. The heat exchanger 6 is disposed geodesically at an adequate height so that the fresh water stored therein flows out into the pump sump 11 due to the effect of gravity and fills the wash container 1 to a predetermined fill level h, as shown in FIG. 4. The water surface delimiting the wash compartment in a downward direction acts as an additional condensation surface. The wash container base and the pump sump 11 are cooled at the same time.

In a further method step the fresh water in the wash container 1 is conducted into the wash liquor storage unit 19. The control facility 27 starts the circulation pump 13 operating for this purpose. At the same time the control facility 27 switches the three-way switching valve 25 to the switching position shown in FIG. 4 in which the circulation line 9 is connected to the connecting line 23 leading to the wash liquor storage unit 19. As a result the fresh water is conducted on into the wash liquor storage unit 19, as shown in FIG. 5.

Figure 5:
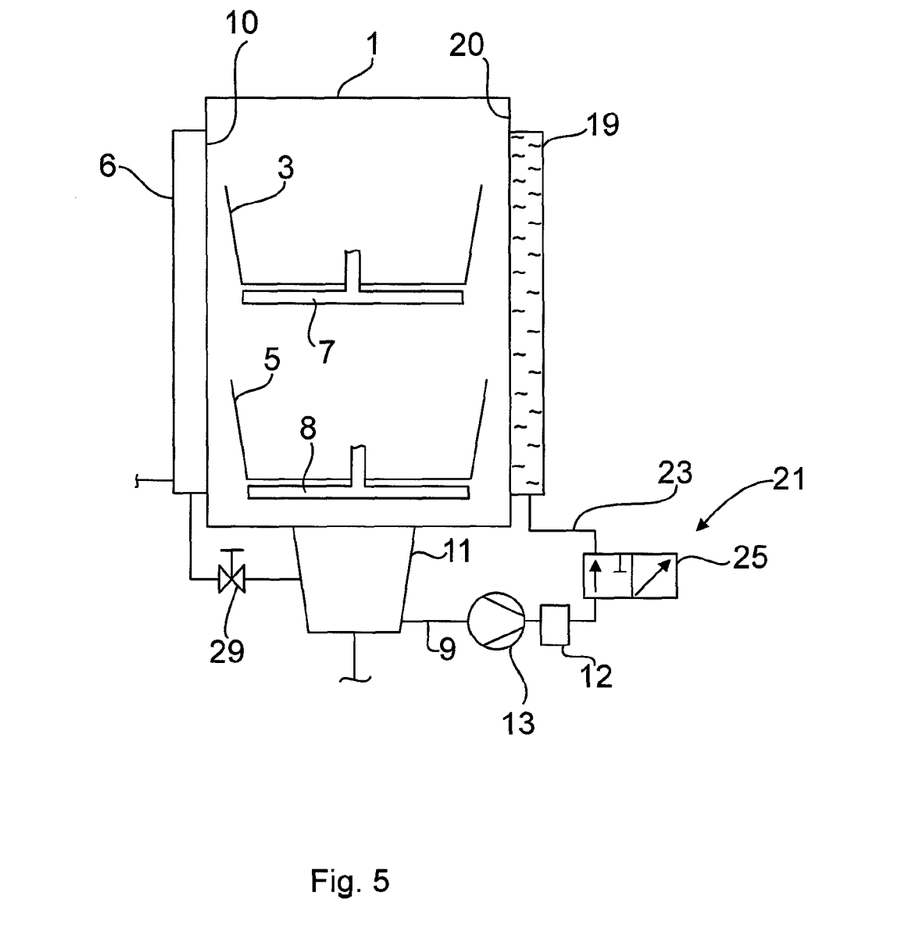

The fresh water pumped into the wash liquor storage unit 19 according to FIG. 5 cools the second wash container side wall 20, thereby providing a further cold condensation surface, on which the moisture-laden air can condense.

Figure 6:
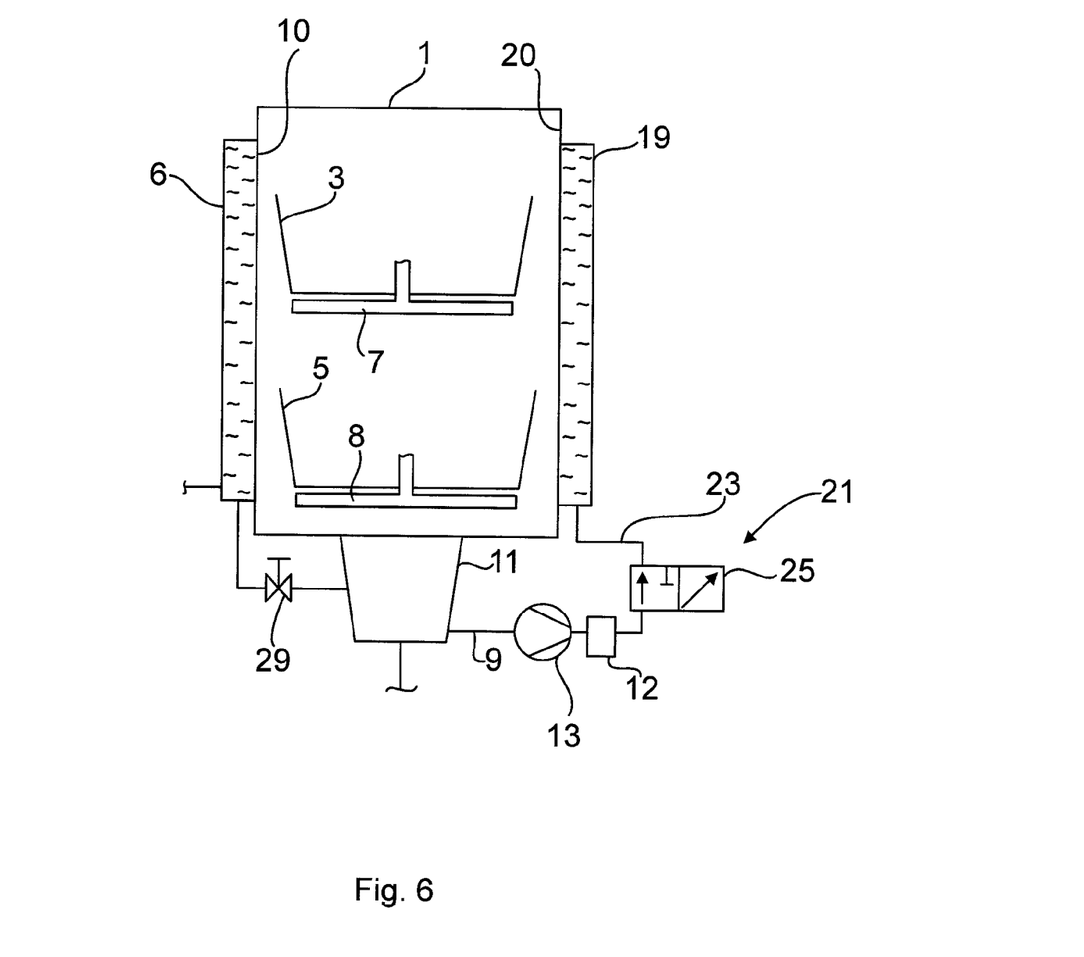

Drying efficiency is enhanced further if the first heat exchanger 6 is filled again with new cold fresh water, as shown in FIG. 6. This means that the first wash container side wall 10 is cooled again. Alternatively the first heat exchanger 6 can be filled with fresh water again in the method step shown in FIG. 4, in other words immediately after it has been emptied. This allows a quantity of fresh water to be provided at the same time both in the first heat exchanger 6 and also in the second heat exchanger 19.

After the drying step T has been executed, the fresh water can remain in the first heat exchanger 6 and in the wash liquor storage unit 19 until the next wash operation. In the next wash operation the fresh water can then be reused in particular in the prewash step V or in the cleaning step R.

LIST OF REFERENCE CHARACTERS

1 Wash container
3 Rack
5 Rack
6 First heat exchanger
7 Spray arm
8 Spray arm
9 Circulation line
10 First wash container side wall
11 Pump sump
12 Heating element
13 Circulation pump
14 Supply line
15 Supply lines
16 Fresh water supply line
17 Discharge line
18 Drain pump
19 Storage container
20 Second wash container side wall
21 Branch point
23 Connecting line
25 Three-way switching valve
27 Control facility
28 Water inlet valve
29 Check valve
$\Delta t_H$ Heating phase
V Prewash
R Cleaning
Z Intermediate rinse
K Final rinse
T Drying

The invention claimed is:

1. A washing method for a dishwasher having a wash container that delimits a wash compartment, the washing method comprising:
condensing, in a first drying step of a wash operation, one of moisture-laden air and water vapor on a first side wall of the wash container by providing a first heat exchanger that is thermally coupled to the wash container with a first supply of fresh water;
condensing, in a second drying step of a wash operation, one of moisture-laden air and water vapor in the wash container by introducing the fresh water from the first heat exchanger to the wash container;
condensing, in a third drying step of the wash operation, one of moisture-laden air and water vapor on a second side wall of the wash container by conducting the fresh water from the wash container to a second heat exchanger that is thermally coupled to the wash container;
condensing, in a fourth drying step of a wash operation, one of moisture-laden air and water vapor on the first side wall of the wash container by providing the first heat exchanger with a second supply of fresh water.

2. A washing method for a dishwasher having a wash container that delimits a wash compartment, the washing method comprising:
condensing, during a drying phase of a wash operation, one of moisture-laden air and water vapor in the wash container by circulating in a predetermined sequence, a body of water between a heat exchanger that is thermally coupled to the wash container, the wash container and a storage container that is thermally coupled to the wash container, the predetermined sequence comprising first filling the heat exchanger with the body of water, subsequently filling the wash container with the body of water and subsequently filling the storage container with the body of water.

3. A washing method for a dishwasher having a wash container that delimits a wash compartment, the washing method comprising:
supplying, in a first drying step, a predetermined volume of fresh water to a first heat exchanger that is thermally coupled to the wash container, thereby providing a first condensation surface;
subsequently introducing, in a second drying step, the predetermined volume of fresh water from the first heat exchanger to the wash container, thereby providing a second condensation surface; and
subsequently conducting, in a third drying step, the predetermined volume of fresh water from the wash container to a second heat exchanger that is thermally coupled to the wash container, thereby providing a third condensation surface.

4. The washing method of claim 3, wherein the first condensation surface comprises a first side wall of the wash container.

5. The washing method of claim 3, wherein the second condensation surface comprises the surface of the predetermined volume of fresh water in the wash container.

6. The washing method of claim 3, wherein the first, second and third condensation surfaces are cooled by water from the same source.

7. The washing method of claim 3, wherein the third condensation surface comprises a second side wall of the wash container.

8. The washing method of claim 3, wherein during the second drying step, the wash container is filled with fresh water up to a predetermined fill level.

9. The washing method of claim 3, wherein after the second heat exchanger is filled with the predetermined volume of water, the first heat exchanger is filled with another predetermined volume of water so that each of the first and second heat exchangers contain water at the same time.

10. A washing method for a dishwasher having a wash container that delimits a wash compartment, the washing method comprising:
buffering in a buffering step, wash liquid that is no longer required during or after execution of a wash operation in a first storage container that is thermally coupled to a first wash container side wall;
sequentially condensing, in a drying step of the wash operation, a) one of moisture-laden air and water vapor in the wash compartment of the wash container on the first wash container side wall and b) one of moisture-laden air and water vapor in the wash compartment of the wash container on a second wash container sidewall thermally coupled to a second storage container; and filling the first storage container with a body of fresh water to provide condensation on the first wash container side wall before or during the drying step and subsequently conducting the body of fresh water to the second storage container during the drying step to provide condensation on the second wash container side wall.

11. The washing method of claim 10, wherein, during the drying step, the wash container is filled up to a predetermined fill level with the fresh water.

12. The washing method of claim 10, wherein, at least one of the first and second storage containers is a heat exchanger.

13. The washing method of claim 12, wherein, the fresh water conducted to the second storage container is subsequently introduced into the wash container up to a predetermined fill level during the drying step.

14. The washing method of claim 12, wherein, after execution of the drying step, the fresh water is buffered in at least one of the first and second storage containers and reused in one of a subsequent wash operation and a subsequent wash cycle.

15. The washing method of claim 12, wherein the drying step is performed after a first washing step in which washing liquid is provided to wash objects in the wash compartment, and wherein the drying step is performed prior to a second washing step in which washing liquid is provided to wash objects in the wash compartment.

16. The washing method of claim 15, wherein during the drying step, the fresh water in the first storage container is conducted to the wash container before being conducted into the second storage container to cool the second wash container side wall.

17. The washing method of claim 15, wherein the first storage container is emptied after the buffering step and filled with fresh water again during the drying step.

18. A dishwasher comprising a control facility, the control facility configured to:
buffer wash liquid that is no longer required during or after execution of a wash operation in a first storage container that is thermally coupled to a first side wall of a wash container of the dishwasher;
sequentially condense, in a drying step of the wash operation, a) one of moisture-laden air and water vapor in the wash compartment of the wash container on the first side wall of the wash container and b) one of moisture-laden air and water vapor in the wash compartment of the wash container on a second side wall of the wash container thermally coupled to a second storage container; and
fill the first storage container with a body of fresh water to provide condensation on the first side wall before or during the drying step and subsequently conducting the body of fresh water to the second storage container during the drying step to provide condensation on the second side wall.

19. The dishwasher of claim 18, wherein at least one of the first and second storage containers comprises a heat exchanger.

20. The dishwasher of claim 18, wherein the first storage container comprises a wash liquor storage unit.

\* \* \* \* \*